(12) United States Patent
Alriksson et al.

(10) Patent No.: US 12,273,289 B2
(45) Date of Patent: Apr. 8, 2025

(54) SYNCHRONIZATION SIGNAL / PHYSICAL BROADCAST CHANNEL BLOCK METHOD DETECTION AND MANAGEMENT

(71) Applicant: Telefonaktiebolaget LM Ericsson (publ), Stockholm (SE)

(72) Inventors: Peter Alriksson, Hörby (SE); Emma Wittenmark, Lund (SE); Stephen Grant, Pleasanton, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 359 days.

(21) Appl. No.: 17/761,004

(22) PCT Filed: Sep. 23, 2020

(86) PCT No.: PCT/EP2020/076611
§ 371 (c)(1),
(2) Date: Mar. 16, 2022

(87) PCT Pub. No.: WO2021/063774
PCT Pub. Date: Apr. 8, 2021

(65) Prior Publication Data
US 2022/0345269 A1 Oct. 27, 2022

Related U.S. Application Data

(60) Provisional application No. 62/909,507, filed on Oct. 2, 2019.

(51) Int. Cl.
*H04W 74/08* (2024.01)
*H04L 5/00* (2006.01)
*H04W 74/0808* (2024.01)

(52) U.S. Cl.
CPC ....... *H04L 5/0048* (2013.01); *H04W 74/0808* (2013.01)

(58) Field of Classification Search
CPC ......... H04W 56/0015; H04W 74/0808; H04W 52/0216; H04L 5/0048
See application file for complete search history.

(56) References Cited

U.S. PATENT DOCUMENTS 12,058,624 B2 * 8/2024 Matsumura ......... H04W 52/242
2016/0227476 A1 8/2016 Yerramalli et al.
(Continued)

FOREIGN PATENT DOCUMENTS

WO 2015088951 A1 6/2015
WO 2016123037 A1 8/2016

OTHER PUBLICATIONS

U.S. Office Action dated Sep. 14, 2022 for U.S. Appl. No. 17/267,358, filed Feb. 9, 2021, consisting of 16 pages.
(Continued)

*Primary Examiner* — Syed Ali
(74) *Attorney, Agent, or Firm* — Weisberg I.P. Law, P.A.

(57) ABSTRACT

Synchronization signal and Physical Broadcast Channel, SS/PBCH, block management. A network node determines whether a network condition is met, signals to a communication terminal to apply a first detection method for SS/PBCH block detection when the network condition is determined to be met, signals to the communication terminal to apply a second detection method for SS/PBCH block detection when the network condition is determined as not met, and transmits SS/PBCH blocks according to the first or the second SS/PBCH block detection method, based on whether the network condition is met. The communication terminal receives the signalling from the network node associated with the communication network, determines whether the indicated SS/PBCH block detection method is a first or a second SS/PBCH block detection method based on the received signalling, and applies, based on the determi-
(Continued)

nation, the first or the second SS/PBCH block detection method for SS/PBCH block detection.

13 Claims, 2 Drawing Sheets

(56) References Cited

U.S. PATENT DOCUMENTS

| | | | |
|---|---|---|---|
| 2018/0220442 A1 | 8/2018 | Urabayashi et al. | |
| 2018/0368186 A1 | 12/2018 | Gu et al. | |
| 2018/0376438 A1 | 12/2018 | Islam et al. | |
| 2019/0021062 A1 | 1/2019 | Abedini et al. | |
| 2019/0037481 A1 | 1/2019 | Zhang et al. | |
| 2019/0052337 A1 | 2/2019 | Kwon et al. | |
| 2019/0191457 A1 | 6/2019 | Si et al. | |
| 2019/0297577 A1 | 9/2019 | Lin et al. | |
| 2019/0313461 A1 | 10/2019 | Jung et al. | |
| 2020/0015214 A1 | 1/2020 | Si et al. | |
| 2020/0022108 A1 | 1/2020 | Chen et al. | |
| 2020/0029238 A1 | 1/2020 | Si et al. | |
| 2020/0053781 A1 | 2/2020 | Pan et al. | |
| 2020/0120634 A1 | 4/2020 | Lee et al. | |
| 2020/0154341 A1 | 5/2020 | Sun et al. | |
| 2020/0187302 A1 | 6/2020 | Si | |
| 2020/0267730 A1* | 8/2020 | Kim | H04W 72/0453 |
| 2020/0288334 A1* | 9/2020 | Takeda | H04W 24/08 |
| 2020/0413356 A1 | 12/2020 | Wang et al. | |
| 2021/0006443 A1 | 1/2021 | Morozov et al. | |
| 2021/0235419 A1 | 7/2021 | Si | |
| 2022/0078686 A1* | 3/2022 | Yiu | H04W 36/00 |
| 2022/0132524 A1* | 4/2022 | Mueck | H04W 72/1215 |
| 2022/0183064 A1* | 6/2022 | Talarico | H04W 74/0816 |
| 2022/0216929 A1* | 7/2022 | Matsumura | H04W 52/146 |
| 2022/0231810 A1* | 7/2022 | Matsumura | H04L 5/0091 |

OTHER PUBLICATIONS

Taiwan Office Action with English Summary Translation dated May 8, 2020 for Patent Application No. 108128370, consisting of 13-pages.
3GPP TSG-RAN WG2#101bis R2-1804536; Title: Discussion on Impact of LBT to Minimum System Information for NR-U; Agenda Item: 11.2; Source: OPPO; Document for: Discussion and decision; Date and Location: Apr. 16-20, 2018, consisting of 4-pages.
3GPP TSG-RAN WG2#101bis Tdoc R2-1806347; Title: Proposal to progress LTE_Aerial-Core; Agenda Item: 9.18.1; Source: Ericsson; Document for: Discussion, Decision; Date and Location: Apr. 16-20, 2018, consisting of 9-pages.
U.S. Notice of Allowance dated Jan. 13, 2023 for U.S. Appl. No. 17/267,358, filed Feb. 9, 2021, consisting of 9 pages.
International Search Report and Written Opinion dated Jan. 20, 2021 for International Application No. PCT/EP2020/076611 filed Sep. 23, 2020, consisting 11 pages.
3GPP TSG-RAN WG1 Meeting #98 R1-1909299; Title: Enhancements to initial access procedure; Agenda Item: 7.2.2.2.2; Source: Ericsson; Document for: Discussion, Decision; Location and Date: Prague, CZ, Aug. 26-30, 2019, consisting of 16 pages.
International Search Report and Written Opinion dated Nov. 12, 2019 for International Application No. PCT/EP2019/071180 filed on Aug. 7, 2019, consisting of 9-pages.
3GPP TSG RAN WG1 Meeting NR#3 R1-1715565; Title: On QCL indication and time repetition of SS blocks; Agenda Item: 6.1.6; Source: Huawei, HiSilicon; Document for: Discussion and Decision; Location and Date: Nagoya, Japan, Sep. 18-21, 2017, consisting of 2-pages.
3GPP TSG RAN WG1 Meeting #90 R1-1715212; Title: WF on SS block QCL Indication; Agenda Item: 6.1.1.1.1; Source: ZTE, Qualcomm, InterDigital, MediaTek, Sierra Wireless; Document for: Discussion and Decision; Location and Date: Prague, Czechia, Aug. 21-25, 2017, consisting of 2-pages.
3GPP TSG-RAN WG1 Meeting #95 R1-1813459; Title: On initial access, RRM, mobility and RLM; Agenda Item: 7.2.2.4.2; Source: Ericsson; Document for: Discussion, Decision; Location and Date: Spokane, USA, Nov. 12-16, 2018, consisting of 15-pages.
3GPP TS 38.213 V15.2.0 3rd Generation Partnership Project; Technical Specification Group Radio Access Network; NR; Physical layer procedures for control (Release 15), Jun. 2018, consisting of 99-pages.
3GPP TSG-RAN WG1 Meeting AH#1901 R1-1900999; Title: Enhancements to initial access procedure; Agenda Item: 7.2.2.2.2; Source: Ericsson; Document for: Discussion, Decision; Location and Date: Taipei, Taiwan, Jan. 21-25, 2019, consisting of 12-pages.
3GPP TSG-RAN WG1 Meeting #94 R1-1809205; Title: On initial access, RRM, mobility and RLM; Agenda Item: 7.2.2.4.2; Source: Ericsson; Document for: Discussion, Decision; Location and Date: Gothenburg, Sweden, Aug. 20-24, 2018, consisting of 9-pages.
3GPP TSG-RAN WG1 Meeting #94bis R1-1811302; Title: On initial access, RRM, mobility and RLM; Agenda Item: 7.2.2.4.2; Source: Ericsson; Document for: Discussion, Decision; Location and Date: Chengdu, China, Oct. 8-12, 2018, consisting of 9-pages.
3GPP TSG-RAN WG1 Meeting #96 R1-1902884; Title: Enhancements to initial access procedure; Agenda Item: 7.2.2.2.2; Source: Ericsson; Document for: Discussion, Decision; Location and Date: Athens, Greece, Feb. 25-Mar. 1, 2019, consisting of 13-pages.
3GPP TSG-RAN WG1 Meeting #96b R1-1904336; Title: Enhancements to initial access procedure; Agenda Item: 7.2.2.2.2; Source: Ericsson; Document for: Discussion, Decision; Location and Date: Xi'an, China, Apr. 8-12, 2019, consisting of 15-pages.
3GPP TSG-RAN WG1 Meeting #97 R1-1907455; Title: Enhancements to initial access procedure; Agenda Item: 7.2.2.2.2; Source: Ericsson; Document for: Discussion, Decision; Location and Date: Reno, USA, May 13-17, 2019, consisting of 14-pages.
Indian Office Action dated Jan. 27, 2022 for Patent Application No. 202147009305, consisting of 6-pages.
3GPP TS 38.213 V15.6.0 3rd Generation Partnership Project; Technical Specification Group Radio Access Network; NR; Physical layer procedures for control (Release 15), Jun. 2019, consisting of 107-pages.
Notice of Allowance dated Jul. 2, 2024 for U.S. Appl. No. 18/302,085, consisting of 10 pages.

\* cited by examiner

SYNCHRONIZATION SIGNAL / PHYSICAL BROADCAST CHANNEL BLOCK METHOD DETECTION AND MANAGEMENT

CROSS-REFERENCE TO RELATED APPLICATIONS

This application is a Submission Under 35 U.S.C. § 371 for U.S. National Stage Patent Application of International Application No.: PCT/EP2020/076611, filed Sep. 23, 2020 entitled "SYNCHRONIZATION SIGNAL/PHYSICAL BROADCAST CHANNEL BLOCK METHOD DETECTION AND MANAGEMENT," which claims priority to U.S. Provisional Application No. 62/909,507, filed Oct. 2, 2019, entitled "SYNCHRONIZATION SIGNAL/PHYSICAL BROADCAST CHANNEL BLOCK METHOD DETECTION AND MANAGEMENT," the entireties of both of which are incorporated herein by reference.

TECHNICAL FIELD

The present invention relates generally to the field of wireless communication. More particularly, it relates to determination of Synchronization Signal/Physical Broadcast Channel (SS/PBCH) block detection methods.

BACKGROUND

New Radio (NR) defines two types of synchronization signals; Primary Synchronization Signals (PSS) and Secondary Synchronization Signals (SSS) and one broadcast channel; Physical Broadcast Channel (PBCH). Further PSS, SSS and PBCH are typically transmitted in one SS/PBCH block (or SSB for short, the terms SSB and SS/PBCH block may be used interchangeably in this disclosure). One or multiple SS/PBCH block(s) can be transmitted within one SS/PBCH period. For a half frame with SS/PBCH blocks, the first symbol indexes for candidate SS/PBCH blocks are determined according to the subcarrier spacing of SS/PBCH blocks as described in 3GPP 38.213 v15.6.0.

The candidate SS/PBCH blocks in a half frame are indexed in an ascending order in time from 0 to L−1. A User Equipment (UE) typically determines the 2 Least Significant Bits (LSB), for L=4, or the 3 LSB bits, for L>4, of a SS/PBCH block index per half frame from a one-to-one mapping with an index of the DM-RS sequence transmitted in the PBCH. For L=64, the UE determines the 3 Most Significant Bits (MSB) of the SS/PBCH block index per half frame by PBCH payload bits. In addition, a half-frame indicator is present in the PBCH payload bits.

In Rel-15 the UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

However, according to Rel-16, the restriction that the UE shall not assume quasi colocation for any other SS/PBCH block transmissions may be relaxed due an increasing number of SS/PBCH block positions as a result of taking into account Listen Before Talk (LBT) procedures when accessing a carrier.

Hence there is a need for alternative solutions for handling usage of the two methods (using fixed positions according to Rel-15, or flexible positions according to Rel-16).

SUMMARY

The current disclosure refers to example scenarios, and associated example problems, where embodiments may be applicable, e.g. the scenario when there is a need for determination of which method is used for transmitting SS/PBCH blocks. It should be noted that such scenarios, problems and applications are merely illustrative examples and are not intended as limiting. Contrarily, embodiments may be equally applicable in other scenarios where LBT procedures are used for communication.

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above disadvantages and to provide methods for determination of which SS/PBCH block detection method should be applied.

According to a first aspect, this is achieved by a method of a network node. The network node is operating in a communication network, and the method is for synchronization signal and Physical Broadcast Channel, SS/PBCH, block management. The method comprises determining whether a network condition is met and signalling to a communication terminal to apply a first detection method for SS/PBCH block detection when the network condition is met.

The method also comprises signalling to the communication terminal to apply a second detection method for SS/PBCH block detection when the network condition is not met and also transmitting SS/PBCH blocks according to the second SS/PBCH block detection method, or according to the first SS/PBCH block detection method, based on whether the network condition is met (or not).

It should be noted that the term communication terminal is in this disclosure interchangeable with the term user equipment, UE.

In some embodiments, the network condition relates to at least one of a current and/or a historical Listen Before Talk, LBT, success rate in the communication network; a delay of SS/PBCH block transmissions; a measured Received Signal Strength Indicator, RSSI; frequency band of operation; length or duration information about a transmission window; and a channel occupancy.

In some embodiments, the network condition is determined to be met when at least one of the following is determined to be true: The current and/or historical LBT success rate is above a predetermined LBT-threshold; the delay of the SS/PBCH block transmissions is below a predetermined SS/PBCH-threshold; the measured RSSI is below a predetermined RSSI-threshold; and the measured channel occupancy is below a predetermined occupancy-threshold.

In some embodiments, transmitting the SS/PBCH blocks according to the first detection method comprises transmitting the SS/PBCH blocks at fixed time positions.

In some embodiments, transmitting the SS/PBCH blocks according to the second detection method comprises transmitting the SS/PBCH blocks at any position within the length of a transmission window.

In some embodiments, the transmission window is a Discovery reference Signal, DRS, transmission window.

In some embodiments, transmitting the SS/PBCH blocks according to the second detection method may comprise determining a modulo parameter Q for determination of quasi co location, QCL, of the SS/PBCH blocks and the any position is a position i which is to be quasi co-located with an SS/PBCH block transmitted in position i+k*Q, where k=0, 1, 2, . . . , and where available positions in the DRS transmission window is determined by sub-carrier spacing for the transmission.

In some embodiments signalling to the communication terminal to apply the first detection method comprises at least one of: signalling a flag to the communication terminal; using a codepoint in one or more reserved bits in a PBCH-payload for indicating use of the first detection method; coupling the first detection method to a first SS/PBCH block pattern; and coupling the first detection method to a first SS/PBCH Block synchronization (sync) raster point group.

In some embodiments signalling the flag comprises at least one of: setting the flag in a system information, SI, message to be transmitted to the network terminal; and signalling the flag to the network terminal through dedicated Radio Resource Control, RRC-signalling.

In some embodiments signalling to the communication terminal to apply the second detection method comprises at least one of: configuring a transmission window with at least a length or a duration parameter; configuring a message comprising the determined Q parameter for the network terminal; using a codepoint in one or more reserved bits in a PBCH-payload to indicate use of the second detection method; coupling the second detection method to a second SS/PBCH block pattern; and coupling the second detection method to a second SS/PBCH block synchronization raster point group.

A second aspect is a method of a communication terminal. The communication terminal operating in a communication network and the method is for synchronization signal/Primary Block Channel, SS/PBCH, block, detection. The method comprises receiving signalling from a network node associated with the communication network, the signalling indicative of a SS/PBCH block detection method. The method also comprises determining whether the indicated SS/PBCH block detection method is a first SS/PBCH block detection method or a second SS/PBCH block detection method based on the received signalling, and applying, based on the determination, the first or the second SS/PBCH block detection method for SS/PBCH block detection.

In some embodiments, receiving signalling and determining whether the indicated SS/PBCH block detection is the first or the second detection method comprises receiving a configuration of a transmission window, determining whether the transmission window configuration comprises at least one of a length and duration parameter and applying the second SS/PBCH block detection method when it is determined that the transmission window configuration does comprise at least one of a length and duration parameter.

In some embodiments, receiving signalling and determining whether the indicated SS/PBCH block detection is the first or the second detection method comprises receiving a system information, SI, message or dedicated Radio Resource Control, RRC-signalling, determining whether the received signalling comprises a flag and applying the first SS/PBCH block detection method when it is determined that the received signalling comprises a flag.

In some embodiments, receiving signalling and determining whether the indicated SS/PB channel block detection method is the first SS/PBCH block detection method or the second SS/PBCH block detection method comprises receiving a code point in one or more reserved bits in a Physical Broadcast Channel, PBCH, payload, wherein at least one of the values 00, 01, 10 and 11 indicates the first SS/PBCH block detection method.

In some embodiments, at least one of the values 00, 01, 10, and 11 indicates the second SS/PBCH block detection method, wherein the value that indicates the second detection method is different from the value which indicates the first detection method.

In some embodiments, receiving signalling and determining whether the indicated SS/PBCH block detection method is the first SS/PBCH block detection method or the second SS/PBCH block detection method comprises receiving an indication of a SS Block Pattern for reception of the SS/PBCH block, applying the first SS/PBCH block detection method if the SS/PBCH pattern indication indicates a block pattern and applying the second SS/PBCH block detection method if the SS/PBCH pattern indication indicates a second block pattern.

In some embodiments, receiving signalling and determining whether the indicated SS/PBCH block detection method is the first SS/PBCH block detection method or the second SS/PBCH block detection method comprises receiving an indication of one or more SS/PBCH block sync raster point groups and determining whether the one or more SS/PBCH block sync raster point groups are indicative of the first or the second SS/PBCH block detection method.

In some embodiments, receiving signalling and determining whether the indicated SS/PBCH block detection method is the first SS/PBCH block detection method or the second SS/PBCH block detection method comprises receiving signalling and determining whether the signalling comprises a Q parameter, applying the second SS/PBCH block detection method when it's determined that the signalling comprises a Q parameter and applying the Q parameter to calculate a quasi-colocation of the SS/PBCH blocks.

A third aspect is a computer program product comprising a non-transitory computer readable medium. The non-transitory computer readable medium has stored there on a computer program comprising program instructions, wherein the computer program is configured to be loadable into a data-processing unit, comprising a processor and a memory associated, with or integral to, the data-processing unit. When loaded into the data-processing unit, the computer program is configured to be stored in the memory, wherein the computer program, when loaded into, and run by, the processor is configured to cause execution of method steps according to any of the methods described in conjunction with first and second aspect.

A fourth aspect is an apparatus comprising controlling circuitry configured for Synchronization Signal/Physical Broadcast Channel, SS/PBCH, block management. The controlling circuitry is configured to cause determination of whether a network condition is met and signalling to a communication terminal, to apply a first detection method for SS/PBCH block detection if it is determined that the network condition is met. The controlling circuitry is also configured to cause signalling to the communication terminal to apply a second detection method for SS/PBCH block detection if it is determined that the network condition is not met and transmission of SS/PBCH blocks according to the first SS/PBCH block detection method or the second SS/PBCH block detection method based on whether the network condition has been met (or not).

A fifth aspect is a network node, configured to operate in a communication network, and comprising the apparatus according to the fourth aspect.

A sixth aspect is an apparatus comprising controlling circuitry, for Synchronization Signal/Physical Broadcast Channel, SS/PBCH block detection. The controlling circuitry is configured to cause reception of signalling from a network node associated with a communication network. The signalling is indicative of a SS/PBCH block detection method. The controlling circuitry is also configured to cause determination of whether the indicated SS/PBCH block detection method is a first SS/PBCH block detection method or a second SS/PBCH block detection method and application of the first or the second SS/PBCH block detection method, based on the determination.

A seventh aspect is a communication terminal, configured to operate in a communication network, and comprising the apparatus according to the sixth aspect.

In some embodiments, any of the above aspects may additionally have features identical with or corresponding to any of the various features as explained above for any of the other aspects. E.g. the embodiments associated with the first and second aspect may be applicable as embodiments to the third-seventh aspects as well.

An advantage of some embodiments is that a method is provided for enabling a communication terminal to determine whether the SS/PBCH blocks are transmitted according to a fixed transmission method or a non-fixed transmission method, and hence apply the correct detection method.

Another advantage of some embodiments is that for deployments where LBT failure is infrequent the communication terminal can be configured with the Rel-15 method, which saves power and processing in the UE. For deployments where LBT failure is low but not infrequent enough to use the Rel-15 method, choosing a configuration with short window duration will also save power and processing in the communication terminal.

Another advantage of some embodiments is that a network node is enabled to determine which SS/PBCH block transmission method should be used based on network performance, and thus improve overall network performance.

Another advantage of some embodiments is that a method is provided enabling simple coexistence between 3GPP Rel-15 and 3GPP Rel-16 applications.

Another advantage of some embodiments is that wireless communication performance is enhanced.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
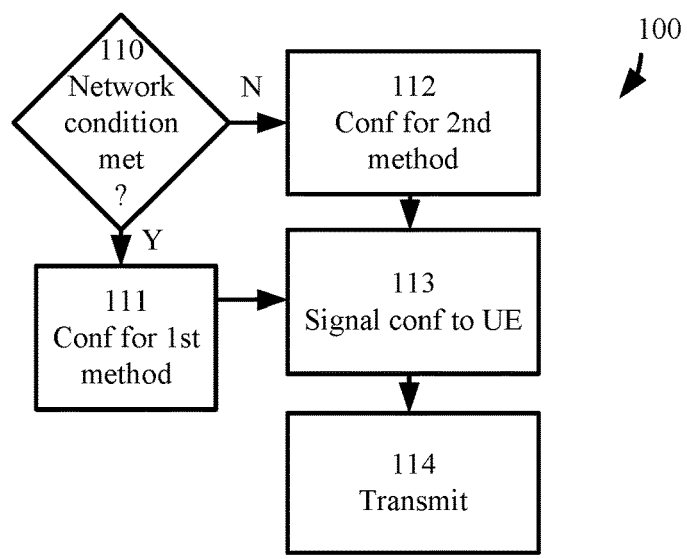
FIG. 1 is a flowchart illustrating example method steps according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It should be noted that when a user equipment (UE) is referred to herein the term is meant to encompass any suitable communication device, not necessarily operated by any user.

In the following, embodiments will be described where determination of which SS/PBCH block detection method should be applied during communication.

It should also be noted that the terms SS/PBCH block and SSB (Synchronization Signal Block) may be used interchangeably in this disclosure.

As noted previously, NR defines two types of synchronization signals; PSS and SSS and one broadcast channel; PBCH. Further PSS, SSS and PBCH are transmitted in one SS/PBCH block or SSB for short. One or multiple SS/PBCH block(s) can be transmitted within one SS/PBCH period. Furthermore, the SS/PBCH blocks can be transmitted according to a pattern/case denoted as patter A, B, C, D, E in 3GPP 38.213.

For a half frame with SS/PBCH blocks, the first symbol indexes for candidate SS/PBCH blocks are determined according to the subcarrier spacing of SS/PBCH blocks as described in 3GPP 38.213 v15.6.0.

The candidate SS/PBCH blocks in a half frame are indexed in an ascending order in time from 0 to L−1. A UE determines the 2 Least Significant Bits (LSB), for L=4, or the 3 LSB bits, for L>4, of a SS/PBCH block index per half frame from a one-to-one mapping with an index of the DM-RS sequence transmitted in the PBCH. For L=64, the UE determines the 3 Most Significant Bits (MSB) of the SS/PBCH block index per half frame by PBCH payload bits. In addition, a half-frame indicator is present in the PBCH payload bits.

In Rel-15 the UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

The SS/PBCH block index is used in for different purposes:

Frame Timing Establishment

By determining the SS/PBCH block index (from the DM-RS sequence and PBCH payload), the half-frame indicator (from the PBCH payload) and the first symbol index of SS/PBCH blocks (from the specification) the UE can establish the start of the radio frame.

Random Access Channel (RACH) Procedure

A UE is provided a number N of SS/PBCH blocks associated with one Primary RACH (PRACH) occasion and a number R of contention-based preambles per SS/PBCH block by higher layer parameter (ssb-perRACH-OccasionAndCB-PreamblesPerSSB). If N<1, one SS/PBCH block is mapped to 1/N consecutive PRACH occasions. If, N>=1, R contention based preambles with consecutive indexes associated with SS/PBCH block, n $0<=n<=N-1$, per PRACH occasion start from preamble index $n*64/N$. SS/PBCH block indexes are mapped to PRACH occasions in the following order:

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

Thus, to summarize, there is typically a mapping from SS/PBCH block index to preamble and/or PRACH occasion.

Radio Resource Management (RRM) Measurements

SS reference signal received power (SS-RSRP) is defined as the linear average over the power contributions (in [W]) of the resource elements that carry secondary synchronization signals (SS). The measurement time resource(s) for SS-RSRP are confined within SS/PBCH Block Measurement Time Configuration (SMTC) window duration.

SS-RSRP should typically be measured only among the reference signals corresponding to SS/PBCH blocks with the same SS/PBCH block index and the same physical-layer cell identity.

Radio Link Monitoring

A UE can typically be configured with a set of resource indexes, through a corresponding set of higher layer parameters (RadioLinkMonitoringRS), for radio link monitoring by higher layer parameter (failureDetectionResources). The UE is provided by higher layer parameter (RadioLinkMonitoringRS), with either a CSI-RS resource configuration index, by higher layer parameter csi-RS-Index, or a SS/PBCH block index, by higher layer parameter ssb-Index.

Operation in Unlicensed Spectrum

In unlicensed spectrum, transmissions are often (depending on regulation) subject to LBT, thus access to the medium cannot be guaranteed. To mitigate this problem the transmitter is often given a window in which transmissions can occur instead of fixed time locations. For example, in Rel-13 LAA the discovery reference signal (DRS) is allowed to move in the discovery timing measurement configuration window (DMTC).

A similar approach has been agreed for the SS/PBCH block(s) for NR-U in Rel-16, where instead of the L=4/8 SSB positions that are defined in Rel-15, Y=10/20 SSB positions are defined. The SSB positions are contained in a so-called DRS transmission window of maximum length 5 ms:

The Agreement Being:

The maximum DRS transmission window duration is 5 ms.

The maximum number of candidate SSB positions within a DRS transmission window, Y, is selected as Y=10 for 15 kHz SCS and Y=20 for 30 kHz SCS.

Note: The number of starting points for DRS transmissions with the 5 ms window that can use a Cat. 2 LBT is to be discussed further as part of channel access discussions.

FFS: If the DRS transmission window is configurable, and if yes, how to configure and indicate the window, including the range of configurable values.

Agreement:

UE determines serving cell timing from the detected SSB candidate position, where the SSB candidate positions within the DRS transmission window are indexed from 0, . . . , Y−1 (Y=10 for 15 kHz SCS and Y=20 for 30 kHz SCS).

Agreement:

The mechanism to determine serving cell timing is as follows:

The SS/PBCH block position index within a DRS transmission window is detected using a combination of PBCH DMRS sequence index and 1 bit/2 bits for 15 kHz SCS/30 kHz SCS of the 3 available bits in the PBCH payload (not in MIB) originally used in Rel-15 FR2 for MSB SSB index 10-bits SFN and half-frame indicator are indicated as in Rel-15

PBCH payload size is not increased compared to Rel-15 oFFS: Whether reuse of other available bits in PBCH payload is also required for timing determination If the UE is required to perform PBCH decoding of neighbor cell(s) (e.g., in asynchronous deployments), an explicit time allowance for acquisition of SSB index is provided to the UE As described previously, in Rel-15 the UE can assume that two SSBs that are transmitted in the same SSB position (i.e. has the same SSB index) are quasi co-located with each other. Further, the UE shall typically not assume quasi co-location (QCL) for any other SS/PBCH block transmissions. In Rel-16 when the number of SSB positions has been increased to account for LBT, and thus an SSB can be transmitted in any of the Y positions, the restriction "the UE shall not assume quasi co-location for any other SS/PBCH block transmissions", may need to be relaxed. This has also been agreed for Rel-16 where the following mechanism has been defined:

Agreement:

For a cell (either serving or a neighbour cell), UE may assume a QCL relation between SS/PBCH blocks within or across DRS transmission or measurement windows that have the same value of modulo(A, Q), once Q is known to the UE A is the PBCH DMRS sequence index.

Note: This agreement extends a prior agreement for serving cells on QCL relation between SS/PBCH blocks to neighbour cells Agreement:

For purposes of SSB QCL derivation, the following values of Q are supported: {1, 2, 4, 8}.

FFS: Further down-selection of allowed values.

To allow the UE to be able to determine which of the two methods for SSB transmission and QCL determination (fixed positions as in Rel-15 baseline or at flexible positions in a DRS transmission window as the Rel-16 extension allows) to apply a method is typically needed.

Thus according to some embodiments, presented herein is a method for determining if SSB(s) are transmitted at fixed locations as in Rel-15 or at flexible positions in a DRS transmission window as allowed by Rel-16.

For the sake of description, it is defined the Rel-15 method, where SSB(s) are transmitted at fixed time positions and the QCL relation is directly determined by the SSB position as method A (in this disclosure the method A is associated with a first SS/PBCH block detection method, e.g. if method A is used to transmit the blocks, then the first SS/PBCH block detection method is used to detect them). Further the method as specified in Rel-16, where SSB(s) can be flexible transmitted in a DRS transmission window of maximum length 5 ms and the QCL relation is determined using the modulo function and the parameter Q is referred to as method B (in this disclosure the method B is associated with a second SS/PBCH block detection method, e.g. if method B is used to transmit the blocks, then the second SS/PBCH block detection method is used to detect them).

FIG. 1 illustrates an example method 100 according to some embodiments.

The method 100 may be a method of a network node operating in a communication network. The method being for synchronization signal/Primary Block Channel, SS/PBCH, block management.

The network node may e.g. be a base station, an eNodeB, a gNB, an access point, a central server etc.

The communication network may be a new radio network. The communication network may utilize different types of Radio Access networks. The communication network may be a 2G, 3G, 4G, 5G, etc. type of network.

The method is for synchronization signal and Physical Broadcast Channel, SS/PBCH, block management. The method 100 starts in step 110 with determining whether a network condition is met. Then the method continues in step 111 with signalling to a communication terminal to apply a first detection method for SS/PBCH block detection when the network condition is met (Y-path out of 110).

The method may, in some embodiments, continue to step 112 with signalling to the communication terminal to apply a second detection method for SS/PBCH block detection when the network condition is not met (N-path out of 110).

The method may then (regardless of whether it continued to step 111 or 112) continue in step 113 with the network node transmitting SS/PBCH blocks (to the communication terminal) according to the second SS/PBCH block detection method (also denoted as the second detection method in this disclosure), or according to the first SS/PBCH block detection method (also denoted as the first detection method in this disclosure), based on whether the network condition is met.

The network condition may relate to at least one of a current and/or a historical Listen Before Talk, LBT, success rate in the communication network; a delay of SS/PBCH block transmissions; a measured Received Signal Strength Indicator, RSSI; and a channel occupancy.

For example, the network condition is typically determined to be met when at least one of the following is determined to be true: The current and/or historical LBT success rate is above a predetermined LBT-threshold; the delay of the SS/PBCH block transmissions is below a predetermined SS/PBCH-threshold; the measured RSSI is below a predetermined RSSI-threshold; and the measured channel occupancy is below a predetermined occupancy-threshold.

Typically, the first detection method using fixed positions according to Rel-15 is power efficient, but not very flexible. Whereas the second detection method using a DRS-transmission window is flexible, but not very power efficient in relation to the first detection method.

Hence, when LBT is historically known to be successful, the first detection method is usually advantageous. This since if LBT is mostly successful, it's an indication that the load on the communication network (i.e. users who want to access the carriers for transmission) is manageable and there is little waiting time for having access. In such a scenario, there is no pressing need for SS/PBCH transmission and detection that is flexible, and the power saving aspect is of higher value.

Thus, in some embodiments, the network node determines to transmit SS/PBCH blocks according to the first or second detection method based on the LBT success rate of historic SS/PBCH block transmissions. If the success rate is above a threshold, transmission according to the first detection method is used and if it is below the threshold transmission according to the second detection method is used.

The same reasoning typically applies for when the delay of SS/PBCH block transmissions is low (i.e. below a predetermined threshold), and/or the measured RSSI is relatively low, and/or the measured channel occupancy is below a predetermined occupancy threshold.

Hence, in some embodiments, the network node determines to transmit SS/PBCH blocks according to the first or the second detection method based on the delay (measured from the first possible transmission opportunity to the actual transmission time) of SS/PBCH block transmissions. If the delay is below a threshold, transmission according to the first detection method is used and if it is above the threshold, transmission according to the second detection method is used.

In some embodiments, the network node determines to transmit SS/PBCH blocks according to the first or the second detection method based on the measured RSSI or channel occupancy. If the RSSI/channel occupancy is below a threshold, transmission according to the first detection method is used and if it is above the threshold, transmission according to the second detection method is used.

What is determined as high/low in this context is of course relative and may vary based on network scenario. A typical high LBT success rate is e.g. a success rate of above 75% (the LBT threshold may hence be at 75%). A typical low measured RSSI is −60 dB (the RSSI may hence be −60 dB). A typical low channel occupancy is 60% of the total channel capacity (the occupancy threshold may hence be 60%). However, other scenarios may have other definitions of high/and low and hence other thresholds. The values are something that may be determined dynamically by e.g. a network operator or network node or similar.

Hence, in scenarios when the few users are connected to the network and/or if the signal strength is weak, then the first detection method is advantageous to apply. The network node signals the use of the first detection method to the communication terminal, and then transmits the SS/PBCH blocks according to the first detection method.

In the same manner, when many users are connected to the network and/or the signal strength is good, then the second detection method is advantageous to apply. The network node signals the use of the second detection method to the communication terminal, and then transmits the SS/PBCH blocks according to the second detection method.

It should be noted that the network node does not apply the detection methods for detecting the SS/PPBCH blocks, but will transmit the blocks according to Rel-15 or Rel-16 transmission agreements. Hence, if the network node transmits according to the Rel-15 agreement, the communication terminal should apply the first detection method, which the network node signals to the communication terminal. In the same manner, if the network node transmits according to the Rel-16 agreement, the communication terminal should apply the second detection method, which the network node signals to the communication terminal.

Furthermore, if the network node has determined to transmit the SS/PBCH blocks according to the second detection method based on any of the above give criteria (LBT, success, latency, occupancy, and RSSI), it may further determines the window duration based on any of the above criteria (LBT-success, latency, occupancy and RSSI). A number of thresholds are used to determine if the window duration should be set to for example 1, 2, 3, 4, or 5 ms.

In some embodiments, the step 114 of the method 100 may comprise transmitting the SS/PBCH blocks according to the first detection method by transmitting the SS/PBCH blocks at fixed time positions.

Additionally or alternatively, in some embodiments, step 114 of the method 100 may comprise transmitting the SS/PBCH block at any position within a length of a Discovery reference Signal, DRS, -transmission window.

Additionally or alternatively, in some embodiments, step 114 of the method 100 may comprise transmitting the SS/PBCH blocks according to the second detection method by determining a modulo parameter Q for determination of quasi co-location, QCL, of the SS/PBCH blocks and the any position is a position i which is to be quasi co-located with an SS/PBCH block transmitted in position i+k*Q, where k=0, 1, 2, . . . , and where available positions in the DRS transmission window is determined by sub-carrier spacing for the transmission.

When using fixed positions for transmitting the SS/PBCH blocks (i.e. according to the first detection method), the wireless communication terminal will know where the quasi colocations are, and there is hence no need to a supply a parameter defining this. However, when the transmissions occur at unfixed positions, and a transmission window (e.g. a DRS transmission window) is used (transmission according to the second detection method), then the communication terminal should preferably be informed of where is may expect/look for quasi colocation of the transmitted blocks.

Hence, if the communication terminal receives a Q parameter specifying the quasi colocation of the blocks, then it will know that the second detection method is to be applied, and that it should look for quasi co-located blocks according to the received parameter.

In some embodiments, the step 113 of the method 100, signalling to the communication terminal to apply the first detection method, may comprises at least one of:
  signalling a flag to the communication terminal;
  using a codepoint in one or both reserved bits in a PBCH-payload for indicating use of the first detection method;
  coupling the first detection method to a first SS/PBCH block pattern; and
  coupling the first detection method to a first SS/PBCH block raster point group.

For example setting a flag may comprise setting a bit in a message to the communication terminal. Hence in some embodiments an explicit flag (one bit) is used to indicate use of the first or second detection method. The configuration is given to the communication terminal as part of the system information, e.g. in MIB or SIB1 or some other SI message. For handover and SCell addition purposes the configuration can be given using dedicated RRC signalling.

In some embodiments, signalling the flag may hence comprise at least one of setting the flag in a system information, SI, message to be transmitted to the communication terminal and signalling the flag to the network terminal through dedicated Radio Resource Control, RRC-signalling.

For example, using a code point in one or more (e.g. one or both) reserved bits in the PBCH-payload may comprise using one codepoint of one or more of the reserved bits $\bar{a}_{\bar{j}+6}$ and $\bar{a}_{\bar{j}+7}$ in the PBCH payload to indicate whether the communication terminal shall use the first or the second detection method. In some embodiments, if two of the bits are used, the two bits can take on values (00, 01, 10, and 11). If e.g. the value 11 is signalled by the network node, the communication terminal uses the first detection method. If any of the other values are signalled, the communication terminal uses the second detection method.

In some embodiments, if several code points are used to indicate the second detection method, different code points can indicate different window durations to the communication terminal.

In some embodiments, the network node may couple the choice of detection method to the SS/PBCH block pattern. For example, a new pattern F can be defined and if a frequency band uses pattern F (as specified in 3GPP 38.101-1), SS/PBCH blocks are transmitted according to the second detection method which is applied by the communication terminal.

In some embodiments, the choice of detection method is coupled to the SS/PBCH block synchronization (sync) raster points that are used. For example, the SS/PBCH block sync raster points used for a deployment when the second detection method is to be used could be different from the SS/PBCH block synch raster points that are used for a deployment where the first detection method is to be used.

For example, the sync raster points can be split into two groups, where sync raster points in the first group correspond to the first detection method and sync raster points in the second group to the second detection method.

In some embodiments, the method step 112, signalling to the network terminal to apply the second detection method, of the method 100 may comprises at least one of:
  configuring the transmission window with at least a length or a duration parameter;
  configuring a message comprising the determined Q parameter for the communication terminal;
  using a codepoint in one or more reserved bits in a PBCH-payload to indicate use of the second detection method;
  coupling the second detection method to a second SS/PBCH block pattern; and
  coupling the second detection method to a second SS/PBCH Block sync raster point group.

In some embodiments, configuring the transmission window may comprise configuring the transmission window to the communication terminal. Hence, when the configuration is present, the communication terminal applies the configuration and uses the second detection method. If the configuration is not present, the communication terminal uses first detection method.

For example, the transmission window configuration should preferably at least include a length or a duration parameter. Alternatively or additionally, an offset and a periodicity may be configured. The configuration is signalled to the communication terminal as part of the system information, e.g. in SIB1 or some other SI message. In case the configuration only contains a length/duration, it may be signalled to the communication terminal as part of MIB. For handover and SCell addition purposes the configuration can be given using dedicated RRC signalling.

In some embodiments, the configuration may be used to determine use of the first detection method as well. For example, the length/duration is signalled as zero, the communication terminal applies the first detection method.

The length/duration typically indicates where the window ends. The starting point is fixed equal to the starting point of the half-frame in which the UE detected the SS/PBCH block(s).

The window then repeats every X ms where X is configured in ssb-PeriodicityServingCell ENUMERATED {ms5, ms10, ms20, ms40, ms80, ms160}, which is defined in Rel-15.

In some embodiments, the length parameter may indicate a slot or resource block, etc. In some embodiments, the duration parameter may indicate time in e.g. us, ms, etc.

In some embodiments, length may have the same meaning as duration and may hence only be two different words for the same thing.

In some embodiments, the parameter Q is configured to the communication terminal. If the configuration is present, the communication terminal applies the configuration and uses the second detection method. If the configuration is not present, the communication terminal uses the first detection method.

In some embodiments, if Q is signaled as zero, the communication terminal may apply the first detection method. The configuration is signaled to the communication terminal as part of the system information, e.g. in MIB or SIB1 or some other SI message. For handover and SCell addition purposes the configuration can be given using dedicated RRC signaling. For RRM measurements Q may be signaled as part of the measurement configuration (MeasObjectNR, SIB2, SIB4). For RRCRelease with redirect info, Q is signaled as part of the CarrierInfoNR IE. In some embodiments, Q may be signaled and/or set as a part of the window configuration.

In some embodiments, the choice of detection method to be used may be coupled to the frequency band. For example, if the communication terminal is operating on band n46, the second detection method is used.

The base station (or network node, the terms may be used interchangeably in this disclosure) may e.g. signal to the communication terminal that it should operate at a certain band.

In some embodiments, the communication terminal may signal to the base station which band it is operating on and the base station may signal to the communication terminal which detection method should be applied, based on what frequency band the terminal is operating on.

In some embodiments, the use of detection method may be pre-configured to each band, hence a network terminal is aware of which detection method should be applied when utilizing a certain band.

Figure 2:
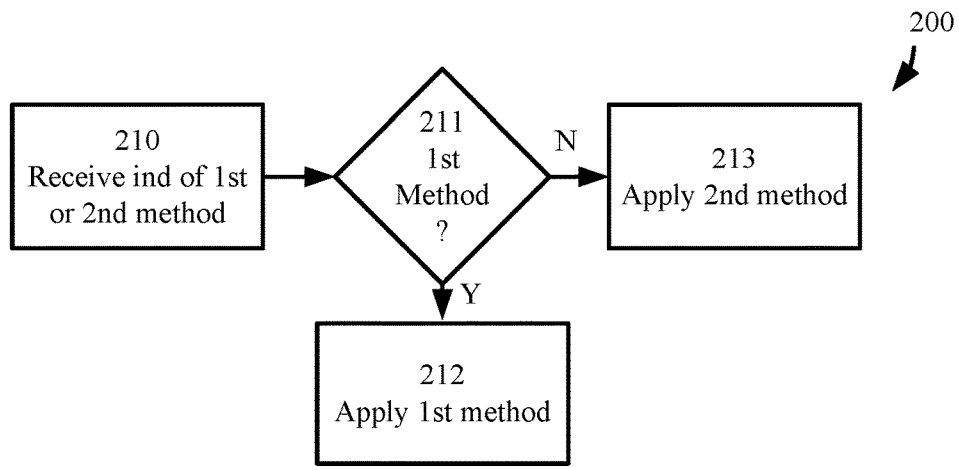
FIG. 2 is a flowchart illustrating example method steps according to some embodiments.

FIG. 2 illustrates an example method 200 according to some embodiments. The method 200 may be a method of a communication terminal operating in a communication network. The method being for synchronization signal/Primary Block Channel, SS/PBCH, block, detection.

The communication terminal may e.g. be a wireless communication device, communication device, user equipment, mobile device, mobile communication device, access terminal etc. The communication terminal may e.g. be a mobile phone, laptop, tablet or similar.

The communication network may be a new radio network. The communication network may utilize different types of Radio Access networks. The communication network may be a 2G, 3G, 4G, 5G, etc. type of network.

The method 200 starts in step 210 with receiving signalling from a network node associated with the communication network, the signalling indicative of a SS/PBCH block detection method.

The network node may e.g. be the network node as described in conjunction with FIG. 1, and configured to carry out the method 100.

Then the method 200 continues in step 211 with determining whether the indicated SS/PBCH block detection method is a first SS/PBCH block detection method or a second SS/PBCH block detection method based on the received signalling.

If/when in step 211, it is determined that the indicated detection method is the first detection method (Y-path out of 211) the method 200 continues to step 212, whereas when it is determined that the indicated detection method is not the first detection method (N-path out of 211, i.e. it is the second detection method) the method 200 continues in step 213.

Then, the method continues with applying, based on the determination, the first (step 212) or the second (step 213) SS/PBCH block detection method for SS/PBCH block detection.

In some embodiments, the steps 210 and 211 of receiving signalling and determining whether the indicated SS/PBCH block detection is the first or the second detection method may comprise: receiving (step 210) a configuration of a, transmission window and determining whether the detection window configuration comprises at least one of a length and duration parameter and applying (step 213) the second SS/PBCH block detection method when it is determined that the DRS detection window configuration does comprise at least one of a length and duration parameter.

In some embodiments, the transmission window is a Discovery Reference Signal, DRS, transmission window.

In some embodiments, when the configuration is present, the communication terminal applies the configuration and uses the second detection method. If the configuration is not present, the communication terminal uses first detection method.

The transmission window configuration should preferably at least include a length or a duration parameter. In addition, the configuration may comprise an offset and a periodicity. The configuration may be signalled to the communication terminal as part of the system information, e.g. in SIB1 or some other SI message. In case the configuration only contains a length/duration, it may be signalled to the communication terminal as part of MIB. For handover and SCell addition purposes the configuration can be signalled using dedicated RRC signalling. In some embodiments, the configuration may be used to determine use of the first detection method as well. E.g., the length/duration is signalled as zero, the communication terminal applies the first detection method.

The length/duration typically indicates where the window ends. The starting point is fixed equal to the starting point of the half-frame in which the UE detected the SS/PBCH block(s).

The window then repeats every X ms where X is configured in ssb-PeriodicityServingCell ENUMERATED {ms5, ms10, ms20, ms40, ms80, ms160}, which is defined in Rel-15.

In some embodiments, the length parameter may indicate a slot or resource block, etc. In some embodiments, the duration parameter may indicate time in e.g. μs, ms, etc.

In some embodiments, length may have the same meaning as duration and may hence only be two different words for the same thing.

In some embodiments, the steps of receiving signalling (step 210) and determining (step 211) whether the indicated SS/PBCH block detection is the first or the second detection method may comprise receiving a system information, SI, message or dedicated Radio Resource Control, RRC-signalling, determining whether the received signalling comprises a flag and applying the first SS/PBCH block detection method (step 212) when it is determined that the received signalling comprises a flag.

In some embodiments an explicit flag (one bit) is used to indicate use of the first or second detection method. The configuration may be signalled to the communication terminal as part of the system information, e.g. in MIB or SIB1 or some other SI message. For handover and SCell addition purposes the configuration can be given using dedicated RRC signalling.

In some embodiments, the steps of receiving signalling (step 210) and determining (step 211) whether the indicated SS/PB channel block detection method is the first SS/PBCH block detection method or the second SS/PBCH BLOCK detection method may comprise receiving a code point in one or more reserved bits in a Physical Broadcast Channel, PBCH, payload wherein at least one of the values 00, 01, 10 and 11 indicates the first SS/PBCH block detection method.

Using a code point in one or more reserved bits in the PBCH-payload may e.g. comprise that one codepoint of one or more of the reserved bits $\bar{a}_{\bar{j}+6}$ and $\bar{a}_{\bar{j}+7}$ in the PBCH payload is used to indicate whether the communication terminal shall use the first or the second detection method. In some embodiments, if two of the bits are used, the two bits can take on values (00, 01, 10, and 11). If e.g. the value 11 is signalled by the network node, the communication terminal uses the first detection method. If any of the other values are signalled, the communication terminal uses the second detection method. It should be noted that the above is just an example, and any of the indicated values are available for indicating a certain method, as long as the same value is not used to indicate both the first and the second detection method.

In some embodiments, if several code points are used to indicate the second detection method, different code points can indicate different window durations to the communication terminal.

This is an effective way to provide more information to the communication terminal on where/when it may detect the SS/PBCH blocks.

Hence, the communication terminal may check the value of the code point in order to determine which detection method to use.

In some embodiments, the steps of receiving (step 210) signalling and determining (step 211) whether the indicated SS/PBCH block detection method is the first SS/PBCH block detection method or the second SS/PBCH BLOCK detection method comprises receiving an indication of a SS Block Pattern for reception of the SS/PBCH block, applying the first SS/PBCH block detection method (step 212) if the SS/PBCH pattern indication indicates a block pattern and applying the second SS/PBCH block detection method (step 213) if the SS/PBCH pattern indication indicates a second block pattern.

In some embodiments, the network node may couple the choice of detection method to the SS/PBCH block pattern. For example, a new pattern F can be defined and if a frequency band uses pattern F (as specified in 3GPP 38.101-1), SS/PBCH blocks are transmitted according to the second detection method which detection method is applied by the communication terminal. The network node may signal an indication to the communication terminal of which block pattern is going to be used. Based on this, the communication terminal will have knowledge of which detection method should be applied.

In some embodiments, the steps of receiving signalling (step 210) and determining (step 211) whether the indicated SS/PBCH block detection method is the first SS/PBCH block detection method or the second SS/PBCH block detection method comprises receiving an indication (step 210) of one or more SS/PBCH block synchronization (sync) raster point groups and determining (step 211) whether the one or more SS/PBCH block sync raster point groups are indicative of the first or the second SS/PBCH block detection method.

In some embodiments, the choice of detection method is coupled to the SS/PBCH block sync raster points that are used. For example, the SS/PBCH block sync raster points used for a deployment where the second detection method is to be used could be different from the SS/PBCH block sync raster points that are used for a deployment where the first detection method is to be used. The communication terminal may be informed of this by the network node.

In some embodiments, the steps of receiving signalling (step 210) and determining (step 211) whether the indicated SS/PBCH block detection method is the first SS/PBCH block detection method or the second SS/PBCH block detection method may comprise receiving signalling and determining whether the signalling comprises a Q parameter, applying (step 213) the second SS/PBCH block detection method when it's determined that the signalling comprises a Q parameter and applying the Q parameter to calculate a quasi-colocation of the SS/PBCH blocks.

In some embodiments, the parameter Q is configured to the communication terminal. If the configuration is present, the communication terminal applies the configuration and uses the second detection method (step 213). If the configuration is not present, the communication terminal uses the first detection method (step 212).

In some embodiments, if Q is signaled as zero, the communication terminal may apply the first detection method (step 212). The configuration is signaled to the communication terminal as part of the system information, e.g. in MIB or SIB1 or some other SI message. For handover and SCell addition purposes the configuration can be given using dedicated RRC signaling. For RRM measurements Q may be signaled as part of the measurement configuration (MeasObjectNR, SIB2, SIB4). For RRCRelease with redirect info, Q is signaled as part of the CarrierInfoNR IE. In some embodiments, Q may be signaled and/or set as a part of the window configuration.

Figure 3:
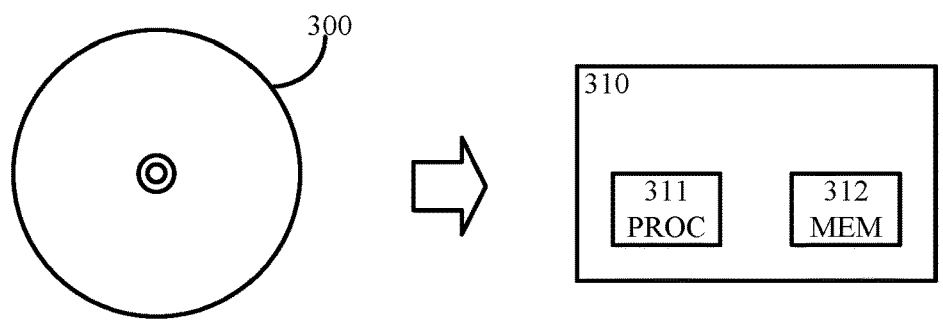
FIG. 3 is a block diagram illustrating an example computer program product according to some embodiments.

FIG. 3 illustrates a computer A computer program product 300 comprising a non-transitory computer readable medium. The non-transitory computer readable medium has stored there on a computer program comprising program instructions, wherein the computer program is configured to be loadable into a data-processing unit 310, comprising a processor (PROC) 311 and a memory (MEM) 312 associated with or integral to the data-processing unit 310. When loaded into the data-processing unit 310, the computer program is configured to be stored in the memory 312, wherein the computer program, when loaded into and run by the processor 311 is configured to cause execution of method steps according to any of the methods described in conjunction with FIGS. 1-2 or otherwise described herein.

According to some embodiments, the computer program product comprises a computer readable medium such as, for example a universal serial bus (USB) memory, a plug-in card, an embedded drive or a read only memory (ROM).

The processing unit 310 may e.g. be comprised in communication terminal (e.g. the communication terminal described in conjunction with any of the previous FIGS. 1-2) or a network node (e.g. the network node as described in conjunction with any of the previous FIGS. 1-2).

Figure 4:
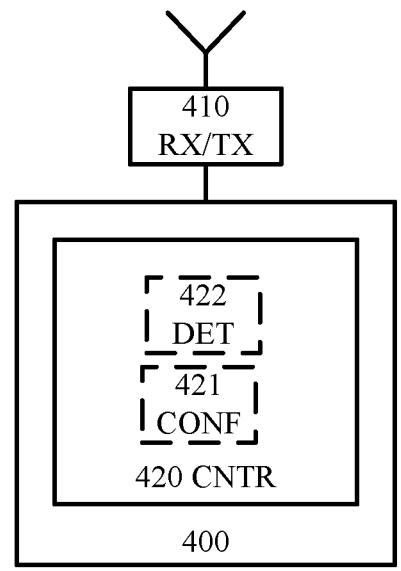
FIG. 4 is a block diagram illustrating an example apparatus according to some embodiments.

FIG. 4 illustrated an example apparatus 400 according to some embodiments. The apparatus 400 comprises a controlling circuitry (CNTR) 420 (e.g. a controller) configured for Synchronization Signal/Physical Broadcast Channel, SS/PBCH, block management. The controlling circuitry 420 may be configured to carry out the method 100 as described in conjunction with FIG. 1.

The controlling circuitry is configured to cause determination of whether a network condition is met (compare with method step 110). The controlling circuitry may e.g. comprise a determiner (or determining module, the terms may be used interchangeably) (DET) 422 for causing the determination.

The controlling circuitry 420 is further configured to cause signalling to a communication terminal to apply a first detection method for SS/PBCH block detection if it is determined that the network condition is met (compare with method step 111 and 113).

The apparatus 400 may e.g. comprise a transceiver circuit (RX/TX) 410 comprising an antenna, and the controlling circuitry may be configured to cause the transceiver circuitry to signal the communication terminal.

The controlling circuitry may further be configured to cause (e.g. by causing the transceiver circuit) signalling to the communication terminal to apply a second detection method for SS/PBCH block detection when it is determined that the network condition is not met (compare with method step 112 and 113).

The controlling circuit may further be configured to cause (e.g. by causing the transceiver circuit to transmit) transmission of SS/PBCH blocks according to the first SS/PBCH block detection method or the second SS/PBCH block detection method based on whether the network condition is determined to be met.

The network condition may relate to at least one of a current and/or a historical Listen Before Talk, LBT, success rate in the communication network; a delay of SS/PBCH block transmissions, a measured Received Signal Strength Indicator, RSSI; and a channel occupancy.

For example, the network condition is typically determined to be met (e.g. by the determiner 422 and/or the controlling circuitry 420) when at least one of the following is determined to be true: The current and/or historical LBT success rate is above a predetermined LBT-threshold; the delay of the SS/PBCH block transmissions is below a predetermined SS/PBCH-threshold; the measured RSSI is below a predetermined RSSI-threshold; and the measured channel occupancy is below a predetermined occupancy-threshold.

When LBT is historically known to be successful, the first detection method is usually advantageous. This since if LBT is mostly successful, it's an indication that the load on the communication network (i.e. users who want to access the carriers for transmission) is manageable and there is little waiting time for having access. In such a scenario, there is no large need for SS/PBCH transmission and detection that is flexible, and the power saving aspect is typically of higher value.

Thus, in some embodiments, the controlling circuitry 420 is configured to cause transmission of SS/PBCH blocks according to the first or second detection method based on the LBT success rate of historic SS/PBCH block transmissions. If the success rate is above a threshold, transmission according to the first detection method is caused and if it is below the threshold transmission according to the second detection method is caused.

The same reasoning typically applies for when the delay of SS/PBCH block transmissions is low (i.e. below a predetermined threshold), and/or the measured RSSI is relatively low, and/or the measured channel occupancy is below a predetermined occupancy threshold.

Hence, in some embodiments, the controlling circuitry is configured to cause transmission (e.g. by causing the transceiver circuit to transmit) of SS/PBCH blocks according to the first or the second detection method based on the delay (measured from the first possible transmission opportunity to the actual transmission time) of SS/PBCH block transmissions. If the delay is below a threshold, transmission according to the first detection method is caused and if it is above the threshold, transmission according to the second detection method is caused (compare with method step 114).

In some embodiments, the controlling circuitry 420 is configured to cause transmission (e.g. by causing the transceiver circuitry 410) of SS/PBCH blocks according to the first or the second detection method based on the measured RSSI or channel occupancy (compare with method step 114). If the RSSI/channel occupancy is below a threshold, transmission according to the first detection method is caused and if it is above the threshold transmission according to the second detection method is caused.

What is determined as high/low in this context is of course relative and may vary based on network scenario. A typical high LBT success rate is e.g. a success rate of above 75%. A typical low measured RSSI is −60 dB. Atypical low channel occupancy is 60% of the total channel capacity Hence, in scenarios when the few users are connected to the network and/or if the signal strength is weak, then the first detection method is advantageous to apply. The controlling circuitry is configured to cause signalling (e.g. by causing the transceiver circuitry 410 to signal) the use of the first detection method to the communication terminal, and causes transmission of the SS/PBCH blocks according to the first detection method.

In the same manner, when many users are connected to the network and/or the signal strength is good, then the second detection method is advantageous to apply. The controlling circuitry is configured to cause signalling (e.g. by causing the transceiver circuitry 410 to signal) the use of the second detection method to the communication terminal, and then cause transmission of the SS/PBCH blocks according to the second detection method.

It should be noted that the controlling circuitry does not apply the detection methods for detecting the SS/PPBCH blocks, but will cause transmission of the blocks according to the Rel-15 or Rel-16 transmission agreements (i.e. transmitting at fixed positions with known quasi location, or at variable positions within a DRS transmission window possibly using other quasi colocations). Hence, if the controlling circuitry causes transmission according to the Rel-15 agreement, the communication terminal should typically apply the first detection method, which the controlling circuitry is configured to signal to the communication terminal. In the same manner, if the controlling circuitry causes transmission according to the Rel-16 agreement, the communication terminal should typically apply the second detection method, which the controlling circuitry signals to the communication terminal.

Furthermore, if the controlling circuitry has determined to cause transmission of the SS/PBCH blocks according to the second detection method based on any of the above given criteria (LBT, success, latency, occupancy, and RSSI), it may further cause determination of a window duration based on any of the above criteria (LBT-success, latency, occupancy and RSSI). A number of thresholds are used for causing determination of whether the window duration should be set to for example 1, 2, 3, 4, or 5 ms. For example, less favorable network conditions, such as if the LBT success rate is low, the latency is high, occupancy is high and RSSI is low may lead to longer window durations such as 3-5 ms. Similarly, better network conditions, such as if the LBT success rate is high, the latency is low, occupancy is low and RSSI is high, then a shorter window duration may be determined such as 1-3 ms.

A shorter window duration gives less time for detection but is cost efficient in terms of power and time. The shorter window duration is favorable when network conditions are good since the probability that successful detection is made during the short time span is higher compared to if a short duration is used when network conditions are less good.

The relative terms of good, bad, worse, high, low in this context are relative and are to a high extent governed by the applicable network scenario.

In some embodiments, the controlling circuitry may be configured to cause transmission (e.g. by causing the transceiver circuit) the SS/PBCH blocks according to the first detection method by causing transmission of the SS/PBCH blocks at fixed time positions (compare with method step 114).

Additionally or alternatively, in some embodiments, the controlling circuitry may be configured to cause transmission of the SS/PBCH blocks according to the second detection method by causing the transmission of the SS/PBCH block at any position within a length of a transmission window (e.g. a DRS transmission window).

Additionally or alternatively, in some embodiments, the controlling circuitry may be configured to cause transmission of the SS/PBCH blocks according to the second detection method by causing determination (e.g. by causing the determiner) of a modulo parameter Q for determination of quasi co-location, QCL, of the SS/PBCH blocks and the any position is a position i which is to be quasi co-located with an SS/PBCH block transmitted in position i+k*Q, where k=0, 1, 2, . . . , and where available positions in the transmission window is determined by sub-carrier spacing for the transmission.

In some embodiments, the controlling circuitry 420 may be further configured to cause at least one of:
signalling of a flag to the communication terminal;
usage of a codepoint in one or more reserved bits in a PBCH-payload for indicating use of the first detection method;
coupling of the first detection method to a first SS/PBCH block pattern; and
coupling of the first detection method to a first SS/PBCH block synchronization (sync) raster point group.

In some embodiments causing signalling of a flag may comprise causing setting of a flag by causing setting of a bit in a message to the communication terminal. Hence in some embodiments an explicit flag (one bit) is used to indicate use of the first or second detection method. The configuration may be signalled to the communication terminal as part of the system information, e.g. in MIB or SIB1 or some other SI message. For handover and SCell addition purposes the configuration can be given using dedicated RRC signalling.

In some embodiments, causing signalling of the flag may hence comprise at least one of causing setting of the flag in a system information, SI, message to be transmitted to the communication terminal and causing signalling of the flag to the communication terminal through dedicated Radio Resource Control, RRC-signalling.

Causing Usage of a code point in one or more reserved bits in the PBCH-payload may e.g. comprise causing usage of one codepoint of one or more of the reserved bits $\bar{a}_{\bar{i}+6}$ and $\bar{a}_{\bar{i}+7}$ in the PBCH payload is to indicate whether the communication terminal shall use the first or the second detection method. In some embodiments, if two of the bits are used, the two bits can take on values (00, 01, 10, and 11). If e.g. the value 11 is signalled by the network node, the communication terminal uses the first detection method. If any of the other values are signalled, the communication terminal uses the second detection method.

In some embodiments, if several code points are used to indicate the second detection method, different code points can indicate different window durations to the communication terminal.

In some embodiments, the controlling circuitry is configured to cause coupling of the choice of detection method to the SS/PBCH block pattern. For example, a new pattern F can be defined and if a frequency band uses pattern F (as specified in 3GPP 38.101-1), SS/PBCH blocks are transmitted according to the second detection method which is applied by the communication terminal.

In some embodiments, the choice of detection method is coupled to the SS/PBCH block raster points that are used. For example, the SS/PBCH block sync raster points used for a deployment when the second detection method is to be used could be different from the SS/PBCH block sync raster points that are used for a deployment where the first detection method is to be used.

The controlling circuitry may hence in some embodiments be configured to cause the setting the sync raster points such that they indicate which detection method should be applied by the communication terminal, and cause signalling of the sync raster points.

In some embodiments, the controlling circuitry is configured to cause signalling to the network terminal to apply the second detection method, by causing at least one of:
configuration of the transmission window with at least a length or a duration parameter;
configuration of a message comprising the determined Q parameter for the communication terminal;
usage of a codepoint in one or both reserved bits in a PBCH-payload to indicate use of the second detection method;
coupling of the second detection method to a second SS/PBCH block pattern; and
coupling of the second detection method to a second SS/PBCH BLOCK raster point group.

In some embodiments, the controlling circuitry may further comprise a configurer (CONF, or configuring module) 421.

The controlling circuitry may be configured to cause configuration of the transmission window (e.g. by causing the configure to configure) to the communication terminal.

The transmission window configuration should preferably at least include a length or a duration parameter. In addition, an offset and a periodicity may be configured. The configuration is signalled to the communication terminal as part of the system information, e.g. in SIB1 or some other SI message. In case the configuration only contains a length/duration, it may be given to the communication terminal as part of MIB. For handover and SCell addition purposes the configuration can be given using dedicated RRC signalling. In some embodiments, the configuration may be used to determine use of the first detection method as well. E.g. the length/duration is signalled as zero, the communication terminal applies the first detection method.

The length/duration typically indicates where the window ends. The starting point is fixed equal to the starting point of the half-frame in which the UE detected the SS/PBCH block(s).

The window then repeats every X ms where X is configured in ssb-PeriodicityServingCell ENUMERATED {ms5, ms10, ms20, ms40, ms80, ms160}, which is defined in Rel-15.

In some embodiments, the length parameter may indicate a slot or resource block, etc. In some embodiments, the duration parameter may indicate time in e.g. µs, ms, etc.

In some embodiments, length may have the same meaning as duration and may hence only be two different words for the same thing.

In some embodiments, the parameter Q is configured to the communication terminal. If the configuration is present, the communication terminal applies the configuration and uses the second detection method. If the configuration is not present, the communication terminal uses the first detection method.

In some embodiments, if Q is signaled as zero, the communication terminal may apply the first detection method. The configuration is signaled to the communication terminal as part of the system information, e.g. in MIB or SIB1 or some other SI message. For handover and SCell addition purposes the configuration can be given using dedicated RRC signaling. For RRM measurements Q may be signaled as part of the measurement configuration (MeasObjectNR, SIB2, SIB4). For RRCRelease with redirect info, Q is signaled as part of the CarrierInfoNR IE. In some embodiments, Q may be signaled and/or set as a part of the window configuration.

In some deployments channel access is not a major problem and LBT failure is infrequent. In such deployments, relying on Rel-15 NR mechanism for QCL and timing determination is sufficient. One simple way of signaling this to the UE is to either let the absence of Q or e.g. the value Q=0 be indicative of that the UE should apply the Rel-15 method of QCL and timing determination. In other words, it is useful to be able to configure whether or not SS/PBCH blocks are allowed to shift in time.

Example: The absence of Q or e.g. the value Q=0 is indicative of that the UE shall apply the Rel-15 method of QCL and timing determination where SS/PBCH blocks do not shift in time.

A related discussion is provided in 3GPP TSG-RAN WG1 Meeting #98bis, R1-1910948, which disclosures are appended hereto.

In some embodiments, the choice of detection method to be used may be coupled to the frequency band. For example, if the communication terminal is operating on band n46, the second detection method is used.

In some embodiments, the apparatus 400 may be comprised in a network node. E.g. the network node as described in conjunction with any of the previous FIGS. 1-3.

Figure 5:
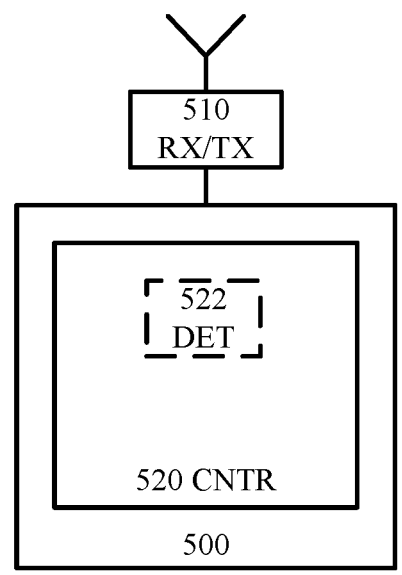
FIG. 5 is a block diagram illustrating an example apparatus according to some embodiments.

FIG. 5 illustrates an example apparatus 500 according to some embodiments. The apparatus 500 may comprise controlling circuitry (CNTR, or a controller) 520 for causing Synchronization Signal/Physical Broadcast Channel, SS/PBCH block detection.

The controlling circuitry 520 may be configured to carry out the method 200 as described in conjunction with FIG. 2.

The controlling circuitry may further comprise a determiner (DET, or determining module) 522. The apparatus may comprise a transceiver circuit (or transceiver circuitry) (RX/TX) 510.

The controlling circuitry may be configured to cause reception of signalling from a network node associated with a communication network, the signalling indicative of a SS/PBCH block detection method (the controlling circuitry may e.g. be configured to cause the transceiver circuit to receive).

The controlling circuitry 520 may be configured to cause determination of whether the indicated SS/PBCH block detection method is a first SS/PBCH block detection method or a second SS/PBCH block detection method (e.g. by causing the determiner to determine).

The controlling circuitry may be configured to cause application of the first or the second SS/PBCH block detection method, based on the determination.

The communication network may be a new radio network. The communication network may utilize different types of Radio Access networks. The communication network may be a 2G, 3G, 4G, 5G etc. type of network.

The network node may e.g. be the network node described in conjunction with any of the previous FIGS. 1-3.

In some embodiments the controlling circuitry may be configured to cause reception (e.g. by causing the transceiver circuit to receive), of signalling and determination (e.g. by causing the determiner to determine) of whether the indicated SS/PBCH block detection is the first or the second detection method by causing reception of a configuration of a transmission window and cause determination of whether the transmission window configuration comprises at least one of a length and duration parameter and cause application of the second SS/PBCH block detection method when it is determined that the transmission window configuration does comprise at least one of a length and duration parameter.

In some embodiments, when the configuration is present, the controlling circuitry is configured to cause application of the configuration and to cause usage of the second detection method. If the configuration is not present, the controlling circuitry is configured to cause usage of first detection method.

The transmission window configuration should preferably at least include a length or a duration parameter. In addition, the configuration may comprise an offset and a periodicity. The configuration may be signalled to the communication terminal as part of the system information, e.g. in SIB1 or some other SI message. In case the configuration only contains a length/duration, it may be signalled to the communication terminal as part of MIB. For handover and SCell addition purposes the configuration can be signalled using dedicated RRC signalling. In some embodiments, the configuration may be used to cause determination of usage of the first detection method as well. E.g., the length/duration is signalled as zero, the controlling circuitry is configured to cause application the first detection method.

The length/duration typically indicates where the window ends. The starting point is fixed equal to the starting point of the half-frame in which the UE detected the SS/PBCH block(s).

The window then repeats every X ms where X is configured in ssb-PeriodicityServingCell ENUMERATED {ms5, ms10, ms20, ms40, ms80, ms160}, which is defined in Rel-15.

In some embodiments, the length parameter may indicate a slot or resource block, etc. In some embodiments, the duration parameter may indicate time in e.g. µs, ms, etc.

In some embodiments, length may have the same meaning as duration and may hence only be two different words for the same thing.

In some embodiments, the controlling circuity may cause reception of signalling and determination of whether the indicated SS/PBCH block detection is the first or the second detection method by causing reception of a system information, SI, message or dedicated Radio Resource Control, RRC-signalling, cause determination of whether the received signalling comprises a flag and cause application of the first SS/PBCH block detection method (step 212) when it is determined that the received signalling comprises a flag.

In some embodiments, an explicit flag (one bit) is used to indicate use of the first or second detection method. The configuration may be signalled to the communication terminal as part of the system information, e.g. in MIB or SIB1 or some other SI message. For handover and SCell addition purposes the configuration can be given using dedicated RRC signalling.

In some embodiments, causing reception of signalling (step 210) and causing determination of whether the indicated SS/PB channel block detection method is the first SS/PBCH block detection method or the second SS/PBCH BLOCK detection method may comprise causing reception of a code point in one or more reserved bits in a Physical Broadcast Channel, PBCH, payload wherein at least one of the values 00, 01, 10 and 11 indicates the first SS/PBCH block detection method.

Using a code point in one or more reserved bits in the PBCH-payload may e.g. comprise that one codepoint of one or more of the reserved bits $\bar{a}_{\bar{A}+6}$ and $\bar{a}_{\bar{A}+7}$ in the PBCH payload is used to indicate whether the communication terminal shall use the first or the second detection method. In some embodiments, if two of the bits are used, the two bits can take on values (00, 01, 10, and 11). If e.g. the value 11 is signalled by the network node, the controlling circuitry causes usage the first detection method. If any of the other values are signalled, the controlling circuitry causes usage of the second detection method. It should be noted that the above is just an example, and any of the indicated values are available for indicating a certain method, as long as the same value is not used to indicate both the first and the second detection method.

In some embodiments, if several code points are used to indicate the second detection method, different code points can indicate different window durations to the communication terminal.

This is an effective way to provide more information to the communication terminal on where/when it may detect the SS/PBCH blocks.

Hence, the controlling circuitry may cause checking of the value of the code point in order to cause determination of which detection method to use.

In some embodiments, causing reception of signalling and causing determination of whether the indicated SS/PBCH block detection method is the first SS/PBCH block detection method or the second SS/PBCH BLOCK detection method comprises causing reception of an indication of a SS Block Pattern for reception of the SS/PBCH block, causing application the first SS/PBCH block detection method if the SS/PBCH pattern indication indicates a block pattern and causing application of the second SS/PBCH block detection method if the SS/PBCH pattern indication indicates a second block pattern.

In some embodiments, the network node may couple the choice of detection method to the SS/PBCH block pattern. For example, a new pattern F can be defined and if a frequency band uses pattern F (as specified in 3GPP 38.101-1), SS/PBCH blocks are transmitted according to the second detection method which is caused to be applied by the controlling circuitry. The network node may then signal an indication to the controlling circuitry of which block pattern is going to be used. Based on this, the controlling circuitry will have knowledge of which detection method should be caused to be applied.

In some embodiments, causing reception of signalling and determination of whether the indicated SS/PBCH block detection method is the first SS/PBCH block detection method or the second SS/PBCH block detection method comprises causing reception of an indication of one or more SS/PBCH block synchronization (sync)raster point groups and determining (compare step 211 of the method 200) whether the one or more SS/PBCH block sync raster point groups are indicative of the first or the second SS/PBCH block detection method.

In some embodiments, the choice of detection method is coupled to the SS/PBCH block sync raster points that are used. For example, the SS/PBCH block sync raster points used for a deployment where the second detection method is to be used could be different from the SS/PBCH block sync raster points that are used for a deployment where the first detection method is to be used. The controlling circuitry may be informed of this by the network node.

In some embodiments, causing reception of signalling (compare with step 210) and determination of (compare with step 211) whether the indicated SS/PBCH block detection method is the first SS/PBCH block detection method or the second SS/PBCH block detection method may comprise causing reception of signalling and causing determination of whether the signalling comprises a Q parameter, causing application of (compare with step 213) the second SS/PBCH block detection method when it's determined that the signalling comprises a Q parameter and causing application of the Q parameter to calculate a quasi-colocation of the SS/PBCH blocks.

In some embodiments, the parameter Q is configured to the controlling circuitry. If the configuration is present, the controlling circuitry applies the configuration and cause usage the second detection method (compare with method step 213). If the configuration is not present, the communication terminal cause usage the first detection method (compare with method step 212).

In some embodiments, if Q is signaled as zero, the controlling circuitry may cause application of the first detection method (compare with step 212). The configuration is signaled to the communication terminal as part of the system information, e.g. in MIB or SIB1 or some other SI message. For handover and SCell addition purposes the configuration can be signaled using dedicated RRC signaling. For RRM measurements Q may be signaled as part of the measurement configuration (MeasObjectNR, SIB2, SIB4). For RRCRelease with redirect info, Q is signaled as part of the CarrierInfoNR IE.

In some embodiments, Q may be signaled and/or set as a part of the window configuration.

In some embodiments, the apparatus 500 may be comprised in a communication terminal. The communication terminal comprising the apparatus 500 may e.g. be the communication terminal described in conjunction with any of the previous FIGS. 1-4.

The described embodiments and their equivalents may be realized in software or hardware or a combination thereof. They may be performed by general-purpose circuits associated with or integral to a communication terminal, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to some embodiments disclosed herein.

Reference has been made herein to various embodiments. However, a person skilled in the art would recognize numerous variations to the described embodiments that would still fall within the scope of the embodiments. For example, the method embodiments described herein describes example methods through method steps being performed in a certain order. However, it is recognized that these sequences of events may take place in another order without departing from the scope of the embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the embodiments.

Any feature of any of the embodiments disclosed herein may be applied to any other embodiment, wherever suitable. Likewise, any advantage of any of the embodiments may apply to any other embodiments, and vice versa. Hence, it should be understood that the details of the described embodiments are merely for illustrative purpose and by no means limiting. Instead, all variations that fall within the range of the claims are intended to be embraced therein.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CPICH Common Pilot Channel
CQI Channel Quality information
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network The disclosure may be summarised by the following embodiments:

1. A method (100), of a network node operating in a communication network, for synchronization signal and Physical Broadcast Channel, SS/PBCH, block management, the method comprising
   determining (110) whether a network condition is met;
   signalling (111, 113) to a communication terminal to apply a first detection method for SS/PBCH block detection when the network condition is determined to be met;
   signalling (112, 113) to the communication terminal to apply a second detection method for SS/PBCH block detection when the network condition is determined not be met; and
   transmitting (114) SS/PBCH blocks according to the second SS/PBCH block detection method, or according to the first SS/PBCH block detection method, based on whether the network condition is met.
2. The method according to embodiment 1, wherein the network condition relates to at least one of a current and/or a historical Listen Before Talk, LBT, success rate in the communication network; a delay of SS/PBCH block transmissions; a measured Received Signal Strength Indicator, RSSI; and a channel occupancy.
3. The method according to embodiment 2, wherein the network condition is determined to be met when at least one of the following is determined to be true: The current and/or historical LBT success rate is above a predetermined LBT-threshold; the delay of the SS/PBCH block transmissions is below a predetermined SS/PBCH-threshold; the measured RSSI is below a predetermined RSSI-threshold; and the measured channel occupancy is below a predetermined occupancy-threshold.
4. The method according to any of the previous embodiments 1-3, wherein transmitting (114) the SS/PBCH blocks according to the first detection method comprises:
   transmitting (114) the SS/PBCH blocks at fixed time positions.
5. The method according to any of the previous embodiments 1-4, wherein transmitting (114) the SS/PBCH blocks according to the second detection method comprises:
   transmitting (114) the SS/PBCH at any position within the length of a transmission window.
6. The method of embodiment 5, wherein the method further comprises
   determining (112) a modulo parameter Q for determination of quasi co-location, QCL, of the SS/PBCH blocks and wherein the any position is a position i which is to be quasi co-located with an SS/PBCH block transmitted in position $i+k*Q$, where $k=0, 1, 2, \ldots$, and where available positions in the transmission window is determined by sub-carrier spacing for the transmission.
7. The method according to any of the previous embodiments 1-6, wherein signalling (111, 113) to the communication terminal to apply the first detection method comprises at least one of:
   signalling (113) a flag to the communication terminal;
   using (111, 113) a codepoint of one or more reserved bits in a PBCH-payload for indicating use of the first detection method;
   coupling (111, 113) the first detection method to a first SS/PBCH block pattern; and
   coupling (111, 113) the first detection method to a first SS/PBCH BLOCK synchronization, sync, raster point group.
8. The method according to embodiment 7, wherein signalling the flag comprises at least one of:
   setting (111) the flag in a system information, SI, message to be transmitted to the communication terminal; and
   signalling (113) the flag to the communication terminal through dedicated Radio Resource Control, RRC-signalling.
9. The method according to embodiments 5 or 6 wherein signalling (112, 113) to the communication terminal to apply the second detection method comprises at least one of:
   configuring (112) the transmission window with at least a length or a duration parameter;
   configuring (112) a message comprising the determined Q parameter for the communication terminal;
   using (112) a codepoint in one or more reserved bits in a PBCH-payload to indicate use of the second detection method;
   coupling (112) the second detection method to a second SS/PBCH block pattern; and
   coupling (112) the second detection method to a second SS/PBCH BLOCK sync raster point group.

10. A method (200), of a communication terminal operating in a communication network, for synchronization signal/Primary Block Channel, SS/PBCH, block, detection, the method comprising:
  receiving (210) signalling from a network node associated with the communication network, the signalling indicative of a SS/PBCH block detection method,
  determining (211) whether the indicated SS/PBCH block detection method is a first SS/PBCH block detection method or a second SS/PBCH block detection method based on the received signalling, and
  applying (212, 213), based on the determination, the first or the second SS/PBCH block detection method for SS/PBCH block detection.

11. The method according to embodiment 10, wherein receiving signalling and determining (211) whether the indicated SS/PBCH block detection is the first or the second detection method comprises:
  receiving (210) a configuration of a transmission window;
  determining (211) whether the transmission window configuration comprises at least one of a length and duration parameter; and
  applying (213) the second SS/PBCH block detection method when it is determined that the transmission window configuration does comprise at least one of a length and duration parameter.

12. The method according to embodiment 10, wherein receiving (210) signalling and determining (211) whether the indicated SS/PBCH block detection is the first or the second detection method comprises:
  receiving (210) a system information, SI, message or dedicated Radio Resource Control, RRC-signalling;
  determining (211)whether the received signalling comprises a flag; and
    applying (212) the first SS/PBCH block detection method when it is determined that the received signalling comprises a flag.

13. The method according to embodiment 10, wherein receiving (210) signalling and determining (211) whether the indicated SS/PB channel block detection method is the first SS/PBCH block detection method or the second SS/PBCH BLOCK detection method comprises:
  receiving (210) a code point in one or more reserved bits in a Physical Broadcast Channel, PBCH, payload, wherein at least one of the values 00, 01, 10 and 11 indicates the first SS/PBCH block detection method (211).

14. The method according to embodiment 10, wherein receiving (210) signalling and determining (211) whether the indicated SS/PBCH block detection method is the first SS/PBCH block detection method or the second SS/PBCH block detection method comprises:
  receiving (210) an indication of a SS Block Pattern for reception of the SS/PBCH block;
  applying (212) the first SS/PBCH block detection method if the SS/PBCH pattern indication indicates a block pattern; and
  applying (213) the second SS/PBCH block detection method if the SS/PBCH pattern indication indicates a second block pattern.

15. The method according to embodiment 10, wherein receiving (210) signalling and determining (211) whether the indicated SS/PBCH block detection method is the first SS/PBCH block detection method or the second SS/PBCH block detection method comprises:
  receiving (210) an indication of one or more SS/PBCH block synchronization, sync, raster point groups; and
  determining (211) whether the one or more SS/PBCH block sync raster point groups are indicative of the first or the second SS/PBCH block detection method.

16. The method according to embodiment 10, wherein receiving (210) signalling and determining (211) whether the indicated SS/PBCH block detection method is the first SS/PBCH block detection method or the second SS/PBCH block detection method comprises:
  receiving (210) signalling and determining (211) whether the signalling comprises a Q parameter;
  applying (213) the second SS/PBCH block detection method when it's determined that the signalling comprises a Q parameter; and
  applying the Q parameter to calculate a quasi-colocation of the SS/PBCH blocks.

17. A computer program product (300) comprising a non-transitory computer readable medium, wherein the non-transitory computer readable medium has stored there on a computer program comprising program instructions, wherein the computer program is configured to be loadable into a data-processing unit (310), comprising a processor (311) and a memory (312) associated with or integral to the data-processing unit (310), wherein when loaded into the data-processing unit (310), the computer program is configured to be stored in the memory (312), wherein the computer program, when loaded into and run by the processor (311) is configured to cause execution of method steps according to any of the methods described in conjunction with the embodiments 1-16.

18. An apparatus (400) comprising controlling circuitry (420) and configured for Synchronization Signal/Physical Broadcast Channel, SS/PBCH, block management, the controlling circuitry configured to cause:
  determination of whether a network condition is met;
  signalling to a communication terminal, to apply a first detection method for SS/PBCH block detection when it is determined that the network condition is met;
  signalling to the communication terminal to apply a second detection method for SS/PBCH block detection when it is determined that the network condition is not met; and
  transmission of SS/PBCH blocks according to the first SS/PBCH block detection method or the second SS/PBCH block detection method based on whether the network condition is determined to be met.

19. The apparatus according to embodiment 18, wherein the network condition relates to at least one of a current and/or a historical Listen Before Talk, LBT, success rate in the communication network; a delay of SS/PBCH block transmissions; a measured Received Signal Strength Indicator, RSSI; and a channel occupancy.

20. The apparatus according to embodiment 19, wherein the network condition is determined to be met when at least one of the following is determined to be true: The current and/or historical LBT success rate is above a predetermined LBT-threshold; the delay of the SS/PBCH block transmissions is below a predetermined SS/PBCH-threshold; the measured RSSI is below a predetermined RSSI-threshold; and the measured channel occupancy is below a predetermined occupancy-threshold.

21. The apparatus according to any of the previous embodiments 18-20, wherein the controlling circuitry (420) is configured to cause transmission of the SS/PBCH blocks according to the first detection method by causing:
  transmission the SS/PBCH blocks at fixed time positions.

22. The apparatus according to any of the previous embodiments 18-21, wherein causing transmission of the SS/PBCH blocks according to the second detection method comprises causing:
transmission of the SS/PBCH at any position within the length of a Discovery reference Signal, DRS, -transmission window.
23. The apparatus of embodiment 22, wherein causing transmission of the SS/PBCH blocks according to the second detection method comprises causing:
determination of a modulo parameter Q for determination of quasi co-location, QCL, of the SS/PBCH blocks and wherein the any position is a position i which is to be quasi co-located with an SS/PBCH block transmitted in position i+k*Q, where k=0, 1, 2, . . . , and where available positions in the DRS transmission window is determined by sub-carrier spacing for the transmission.
24. The apparatus according to any of the previous embodiments 18-23, wherein causing signalling to the communication terminal to apply the first detection method comprises at least one of causing:
signalling of a flag to the communication terminal;
usage of a codepoint in one or both reserved bits in a PBCH-payload for indicating use of the first detection method;
coupling of the first detection method to a first SS/PBCH block pattern; and
coupling of the first detection method to a first SS/PBCH block synchronization, sync, raster point group.
25. The apparatus according to embodiment 24, wherein causing signalling of the flag comprises at least one of causing:
setting of the flag in a system information, SI, message to be transmitted to the communication terminal; and
signalling of the flag to the communication terminal through dedicated Radio Resource Control, RRC-signalling.
26. The apparatus according to embodiments 22 or 23 wherein causing signalling to the communication terminal to apply the second detection method comprises causing at least one of:
configuration of the transmission window with at least a length or a duration parameter;
configuration of a message comprising the determined Q parameter for the communication terminal;
usage of a codepoint in one or more reserved bits in a PBCH-payload to indicate use of the second detection method;
coupling of the second detection method to a second SS/PBCH block pattern; and
coupling of the second detection method to a second SS/PBCH block sync raster point group.
27. A network node comprising the apparatus (400) according to any of the embodiments 18-26.
28. An apparatus (500) comprising controlling circuitry (520) and configured for Synchronization Signal/Physical Broadcast Channel, SS/PBCH block detection, the controlling circuitry (520) configured to cause:
reception of signalling from a network node associated with a communication network, the signalling indicative of a SS/PBCH block detection method,
determination of whether the indicated SS/PBCH block detection method is a first SS/PBCH block detection method or a second SS/PBCH block detection method, and
application of the first or the second SS/PBCH block detection method, based on the determination.
29. The apparatus according to embodiment 28, wherein causing reception of signalling and determination of whether the indicated SS/PBCH block detection is the first or the second detection method comprises causing:
reception of a configuration of a transmission window;
determination of whether the transmission window configuration comprises at least one of a length and duration parameter; and
application of the second SS/PBCH block detection method when it is determined that the transmission window configuration does comprise at least one of a length and duration parameter.
30. The apparatus according to embodiment 29, wherein causing reception of signalling and determination of whether the indicated SS/PBCH block detection is the first or the second detection method comprises causing:
reception of a system information, SI, message or dedicated Radio Resource Control, RRC-signalling;
determination of whether the received signalling comprises a flag; and
application of the first SS/PBCH block detection method when it is determined that the received signalling comprises a flag.
31. The apparatus according to embodiment 28, wherein causing reception of signalling and determination of whether the indicated SS/PB channel block detection method is the first SS/PBCH block detection method or the second SS/PBCH block detection method comprises causing:
reception of a code point in one or more reserved bits in a Physical Broadcast Channel, PBCH, payload; wherein at least one of the values 00, 01, 10 and 11 indicates the first SS/PBCH block detection method.
32. The apparatus according to embodiment 28, wherein causing reception of signalling and determination of whether the indicated SS/PBCH block detection method is the first SS/PBCH block detection method or the second SS/PBCH block detection method comprises causing:
reception of an indication of a SS Block Pattern for reception of the SS/PBCH block;
application of the first SS/PBCH block detection method if the SS/PBCH pattern indication indicates a block pattern; and
application of the second SS/PBCH block detection method if the SS/PBCH pattern indication indicates a second block pattern.
33. The apparatus according to embodiment 28, wherein causing reception of signalling and determination of whether the indicated SS/PBCH block detection method is the first SS/PBCH block detection method or the second SS/PBCH block detection method comprises causing:
reception of an indication of one or more SS/PBCH block synchronization, sync, raster point groups; and
determination of whether the one or more SS/PBCH block sync raster point groups are indicative of the first or the second SS/PBCH block detection method.
34. The apparatus according to embodiment 28, wherein causing reception of signalling and determination of whether the indicated SS/PBCH block detection method is the first SS/PBCH block detection method or the second SS/PBCH block detection method comprises:
reception of signalling and determining whether the signalling comprises a Q parameter;
application of the second SS/PBCH block detection method when it's determined that the signalling comprises a Q parameter; and application of the Q parameter to calculate a quasi-colocation of the SS/PBCH blocks.

35. A communication terminal comprising the apparatus (500) according to any of the embodiments 28-34.

7 REFERENCES

[1] R1-1910945, "DL signals and channels for NR-U", Ericsson, RAN1 #98bis, October 2019.
[2] RP-191581, "Guidance on essential functionality for NR-U," RAN, RAN #84, June 2019.
[3] RP-190263, "Status report to TSG: Cross Link Interference (CLI) handling and Remote Interference Management (RIM) for NR", RAN #83, March 2019
[4] RP-191291, ""Status report to TSG: Cross Link Interference (CLI) handling and Remote Interference Management (RIM) for NR", RAN #84, June 2019
[5] R4-1912087, "On RLM in NR-U", RAN4 #92bis, October 2019
[6] R4-1910573, "LS on RSSI definition", RAN4 #92, August 2019
[7] R2-1911861, "LS on additional PDCCH monitoring occasions for paging for NR-U", RAN 2 #107, August 2019
[8] R1-1910947, "Channel access procedures", RAN1 #98b, October 2019

The invention claimed is:

1. A method, of a network node operating in a communication network, for Synchronization Signal/Physical Broadcast Channel, SS/PBCH, block management, the method comprising:
    determining whether a network condition is met;
    signalling to a communication terminal to apply a first SS/PBCH block detection method for SS/PBCH block detection when the network condition is determined to be met, the signalling being comprised in a master information block, MIB;
    signalling to the communication terminal to apply a second SS/PBCH block detection method for SS/PBCH block detection when the network condition is determined not be met, the signalling being comprised in a master information block, MIB;
    transmitting SS/PBCH blocks according to the second SS/PBCH block detection method or according to the first SS/PBCH block detection method, based on whether the network condition is met, transmitting the SS/PBCH blocks according to the first SS/PBCH block detection method including transmitting the SS/PBCH blocks at fixed time positions, transmitting the SS/PBCH blocks according to the second SS/PBCH block detection method including transmitting the SS/PBCH at a variable position within the length of a transmission window; and
    determining a modulo parameter Q for determination of quasi co-location, QCL, of the SS/PBCH blocks, the variable position being a position i that is to be quasi co-located with an SS/PBCH block transmitted in position i+k*Q, where k=0, 1, 2 . . . and where available positions in the transmission window are determined by sub-carrier spacing for the transmission.

2. The method according to claim 1, wherein the network condition relates to:
    at least one from a group consisting of a current and a historical Listen Before Talk, LBT, success rate in the communication network;
    a delay of SS/PBCH block transmissions;
    a measured Received Signal Strength Indicator, RSSI;
    frequency band of operation;
    one of a length and duration information about a transmission window; and
    a channel occupancy.

3. The method according to claim 2, wherein the network condition is determined to be met when at least one of the following is determined to be true:
    the one of the current and historical LBT success rate is above a predetermined LBT-threshold;
    the delay of the SS/PBCH block transmissions is below a predetermined SS/PBCH-threshold;
    the measured RSSI is below a predetermined RSSI-threshold; and
    the measured channel occupancy is below a predetermined occupancy-threshold.

4. The method according to claim 1, wherein the variable position is dependent on the outcome of one of a channel access procedure, a clear channel assessment procedure, or a listen-before-talk (LBT) procedure.

5. The method according to claim 1, wherein signalling to the communication terminal to apply the first detection method comprises at least one of:
    signalling a flag to the communication terminal;
    using a codepoint of one or more reserved bits in a PBCH-payload for indicating use of the first detection method;
    coupling the first detection method to a first SS/PBCH block pattern; and
    coupling the first detection method to a first SS/PBCH BLOCK block synchronization, sync, raster point group.

6. The method according to claim 5, wherein signalling the flag comprises at least one of:
    setting the flag in a system information, SI, message to be transmitted to the communication terminal; and
    signalling the flag to the communication terminal through dedicated Radio Resource Control, RRC-signalling.

7. The method according to claim 1, wherein signalling to the communication terminal to apply the second detection method comprises at least one of:
    configuring the transmission window with at least a length or a duration parameter;
    configuring a message comprising the determined Q parameter for the communication terminal;
    using a codepoint in one or more reserved bits in a PBCH-payload to indicate use of the second detection method;
    coupling the second detection method to a second SS/PBCH block pattern; and
    coupling the second detection method to a second SS/PBCH BLOCK sync raster point group.

8. A method, of a communication terminal operating in a communication network, for Synchronization Signal/Primary Block Channel, SS/PBCH, block, detection, the method comprising:
    receiving signalling from a network node associated with the communication network, the signalling being indicative of a SS/PBCH block detection method and comprised in a master information block, MIB;
    determining whether the indicated SS/PBCH block detection method is a first SS/PBCH block detection method or a second SS/PBCH block detection method based on the received signalling;
    applying, based on the determination, the first or the second SS/PBCH block detection method for SS/PBCH block detection, the first SS/PBCH block detection method including receiving the SS/PBCH blocks at fixed time positions, the second SS/PBCH block detection method including receiving the SS/PBCH at a variable position within the length of a transmission window; and the received signalling including a modulo parameter Q for determination of quasi co-location, QCL, of the SS/PBCH blocks, the variable position being a position i that is to be quasi co-located with an SS/PBCH block transmitted in position i+k*Q, where k=0, 1, 2 . . . and where available positions in the transmission window are determined by sub-carrier spacing for the transmission.

9. The method according to claim 8, wherein one of:

the applying of the first or second SS/PBCH block detection method for SS/PBCH block detection is further based on a used frequency band of operation; and the applying of the first or second SS/PBCH block detection method for SS/PBCH block detection is further based on one of length and duration information about a transmission window.

10. The method according to claim 8, wherein receiving signalling and determining whether the indicated SS/PBCH block detection is the first or the second detection method comprises:

receiving a configuration of a transmission window;

determining whether the transmission window configuration comprises at least one of a length and duration parameter; and applying the second SS/PBCH block detection method when it is determined that the transmission window configuration does comprise at least one of a length and duration parameter.

11. The method according to claim 8, wherein receiving signalling and determining whether the indicated SS/PBCH block detection is the first or the second detection method comprises:

receiving one of a system information, SI, message and a dedicated Radio Resource Control, RRC, signalling;

determining whether the received signalling comprises a flag; and applying the first SS/PBCH block detection method when it is determined that the received signalling comprises a flag.

12. An apparatus of a network node comprising controlling circuitry and configured for Synchronization Signal/Physical Broadcast Channel, SS/PBCH, block management, the controlling circuitry configured to cause:

determination of whether a network condition is met;

signalling to a communication terminal, to apply a first detection method for SS/PBCH block detection when it is determined that the network condition is met, the signalling being comprised in a master information block, MIB;

signalling to the communication terminal to apply a second detection method for SS/PBCH block detection when it is determined that the network condition is not met, the signalling being comprised in a master information block, MIB;

transmission of SS/PBCH blocks according to the first SS/PBCH block detection method or the second SS/PBCH block detection method based on whether the network condition is determined to be met, transmission of the SS/PBCH blocks according to the first SS/PBCH detection method including transmitting the SS/PBCH blocks at fixed time positions, transmitting the SS/PBCH blocks according to the second SS/PBCH detection method including transmitting the SS/PBCH at a variable position within the length of a transmission window; and determination of a modulo parameter Q for determination of quasi co-location, QCL, of the SS/PBCH blocks, the variable position being a position i that is to be quasi co-located with an SS/PBCH block transmitted in position i+k*Q, where k=0, 1, 2 . . . , and where available positions in the transmission window are determined by sub-carrier spacing for the transmission.

13. An apparatus of a communication terminal comprising controlling circuitry and configured for Synchronization Signal/Physical Broadcast Channel, SS/PBCH block detection, the controlling circuitry configured to cause:

reception of signalling from a network node associated with a communication network, the signalling indicative of a SS/PBCH block detection method and comprised in a master information block, MIB;

determination of whether the indicated SS/PBCH block detection method is a first SS/PBCH block detection method or a second SS/PBCH block detection method;

application of the first or the second SS/PBCH block detection method, based on the determination, the first SS/PBCH block detection method including receiving the SS/PBCH blocks at fixed time positions, the second SS/PBCH block detection method including receiving the SS/PBCH at a variable position within the length of a transmission window; and the received signalling including a modulo parameter Q for determination of quasi co-location, QCL, of the SS/PBCH blocks, the variable position being a position i that is to be quasi co-located with an SS/PBCH block transmitted in position i+k*Q, where k=0, 1, 2 . . . and where available positions in the transmission window are determined by sub-carrier spacing for the transmission.

* * * * *